Figure 1:
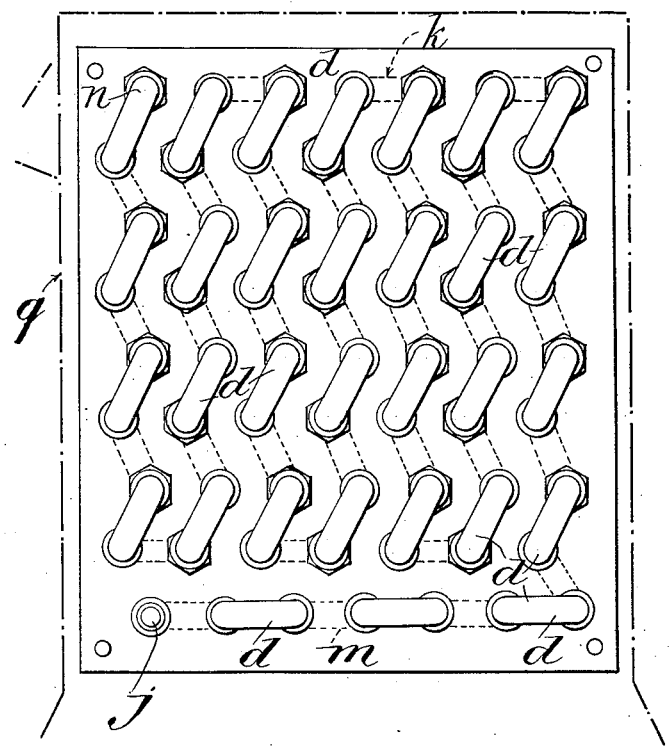

S. H. SHEPHERD.
STEAM GENERATOR.
APPLICATION FILED MAY 10, 1909.

999,187.

Patented July 25, 1911.
2 SHEETS—SHEET 1.

Witnesses:
E. R. Peck
S. L. Burket.

Inventor:
Sidney H. Shepherd
per Hubert E. Peck
atty

S. H. SHEPHERD.
STEAM GENERATOR.
APPLICATION FILED MAY 10, 1909.
999,187.
Patented July 25, 1911.
2 SHEETS—SHEET 2.
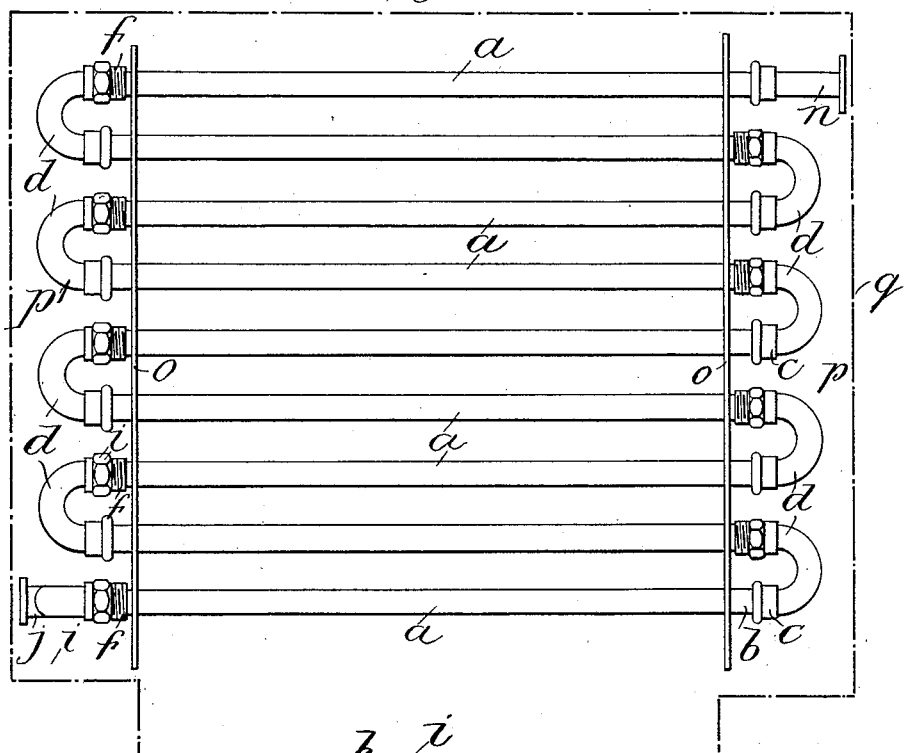
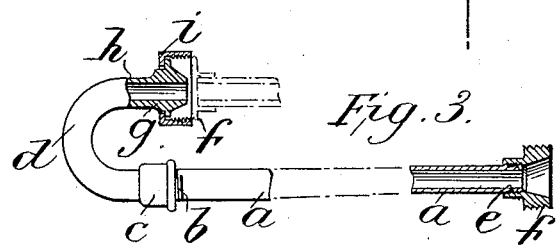

UNITED STATES PATENT OFFICE.

SYDNEY HOWARD SHEPHERD, OF LONDON, ENGLAND.

STEAM-GENERATOR.

999,187.

Specification of Letters Patent. Patented July 25, 1911.

Application filed May 10, 1909. Serial No. 494,957.

*To all whom it may concern:*

Be it known that I, SYDNEY HOWARD SHEPHERD, a subject of the King of Great Britain and Ireland, residing at London, England, have invented Improvements in or Relating to Steam-Generators, of which the following is a specification.

This invention relates to tubulous steam generators of the kind comprising straight tubes connected in series one to another by connectors not subjected to the action of the heater but inclosed to lessen heat radiation and with means for replacing damaged or worn out tubes by fresh tubes and has for object to provide a generator of the type referred to that shall comprise a system of identical and interchangeable straight tubes and connectors, facilities whereby any single tube element can be replaced by another in a brief space of time and without interfering with other tubes, the whole so arranged that the tube system shall constitute in effect when the parts are in position a single smooth surfaced continuous sinuous tube of uniform thickness and full and uniform bore throughout; which tube, except at or near the places of connection of one tube element with another, shall be in direct contact with the hot gases of the chamber and so disposed that steam generated before it leaves the generator will be caused to repeatedly return to the hotter portion of the combustion chamber and be thus highly superheated.

The accompanying drawings illustrate the invention, Figures 1 and 2 being elevations taken at right angles one to another of the general arrangement of the tubes. Fig. 3 is a view of one of the tubular elements removed from the generator and with parts in section.

As shown in the said figures, a series of elements are employed each comprising a straight tube $a$, say a weldless steel tube, having one end $b$ formed with a tapering screw thread for insertion into the faucet end $c$ of a semicircular return bend or connector $d$ which may conveniently be cast of malleable iron thereby obviating the attenuation in parts and other injuries due to bending processes. The other end $e$ of the tube $a$ is likewise formed with a tapering screw thread for insertion into the socket portion $f$ of a union coupling, while the spigot portion $g$ of such a coupling is welded or otherwise secured to the spigot end $h$ of the bend or connector $d$. The spigot and faucet seatings of the union coupling are preferably conical in form so that a tight joint is obtained by means of the coupling nut $i$. The extremities of the tube $a$ may appropriately be expanded within their respective sockets.

The arrangement of the tubes $a$ will be understood from Fig. 1 where the feed inlet $j$ occurs at one of a series of seven horizontally arranged elements, the remaining elements being disposed in vertically arranged sets connected together alternately at the top and bottom, as at $k$ and $m$, so that the path of the steam is as indicated by the arrows, $n$ being the outlet. In order to secure a good heating effect the tubes $a$ are shown as staggered.

In this generator only the lowermost horizontal series of tubes $a$ is subject to the action of the flame, and these being filled with water risk of their being injuriously overheated is obviated or minimized. The remaining tubes contain steam alone and being heated only by hot gases thus likewise greatly reduce the risk of their being injuriously affected. The action of the flame and gases is confined to the tubes $a$ alone, by means of tube plates $o$ each of which forms one wall of a chamber $p$ $p^1$ completed by an asbestos lined or other casing diagrammatically indicated at $q$ acting to conserve heat and within which the bends or connectors $d$ are arranged. The holes in the tube plates $o$ are made sufficiently large to permit the union elements $f$ to pass freely therethrough, so that it will be seen all that is necessary to remove a tube $a$ is to unscrew the coupling nut $i$ of the bend or connector $d$ pertaining to the particular tube and also the coupling nut $i$ pertaining to the bend or connector $d$ of the other tube $a$ to which it is coupled when the element comprising the tube and its attached header can be removed. The fact that each bend or connector has only one coupling nut and that the bends or connectors are alternately arranged as seen in Fig. 1, permits of the said nuts being easily manipulated by a box key. As will be obvious a structure such as the foregoing can be equally well used as a condenser.

What I claim is:—

1. In a steam generator a combustion chamber casing and a single steam generating and super-heating tubular conduit consisting of a series of straight and substantially horizontal tubes all spaced apart horizontally and vertically within the casing and connected by U-shaped unions external to said casing and consisting of a bottom horizontal set and above it a series of vertical sets that together form a path in which fluid circulates zigzag fashion first through said horizontal set and afterward gradually and alternately recedes from and approaches such set substantially as described.

2. In a steam generator a combustion chamber casing and a single steam generating and superheating tubular conduit consisting of a series of straight and substantially horizontal tubes all spaced apart horizontally and vertically in staggered arrangement within the casing and connected by U-shaped unions external to said casing and consisting of a bottom horizontal set, a water inlet thereto external to the casing and at the same level as the said horizontal set, and above said set a series of vertical sets so as to form a path in which fluid circulates zigzag fashion first through said horizontal set and afterward alternately and gradually recedes from and approaches such set, substantially as described.

Signed at London, England, this 23rd day of April 1909.

SYDNEY HOWARD SHEPHERD.

Witnesses:
WILLIAM H. TUTCHENER,
ROBERT RYAN.

---

Copies of this patent may be obtained for five cents each, by addressing the "Commissioner of Patents, Washington, D. C."